June 10, 1969  J. C. FULLER ET AL  3,448,520
APPARATUS FOR VENTING PNEUMATIC TIRES
Filed Oct. 13, 1965  Sheet 1 of 2

John C. Fuller
Gordon W. Fuller
Ralph A. Fuller
William I. Fuller
INVENTORS

BY

*Agent*

John C. Fuller
Gordon W. Fuller
Ralph A. Fuller
William I. Fuller
INVENTORS

United States Patent Office 3,448,520
Patented June 10, 1969

3,448,520
APPARATUS FOR VENTING PNEUMATIC TIRES
John C. Fuller, 5221 SE. Naef Road, Milwaukie, Oreg. 97222; Gordon W. Fuller, 7320 SW. Landeau, St., Portland, Oreg. 97223; Ralph A. Fuller, 12220 SW. Grant, Tigard, Portland, Oreg. 97223, and William I. Fuller, P.O. Box 123, Wilsonville, Oreg. 97070
Filed Oct. 13, 1965, Ser. No. 495,545
Int. Cl. B26f 1/34, 1/24; B32b 31/16
U.S. Cl. 30—361                      2 Claims

ABSTRACT OF THE DISCLOSURE

Tire venting apparatus includes a piercing member movable relative to a tire bead-receiving recess in the body of the apparatus, to pierce the tire from a point on the tire surface outward of the wheel rim area to an internal point adjacent the tire bead. Means is provided for adjusting the width of the recess and for adjusting the angle of penetration of the piercing member, to accommodate tires of various types and sizes.

---

This invention relates to the external venting of pneumatic tires for the purpose of relieving internal air pressure within the cord body.

External venting of pneumatic tires has long been recognized as a necessity to relieve the substantial air pressure which may develop within the cord body of new or retread casings. It is universally recognized in the art that, in the absence of external venting, the development of internal air pressure within the cord body, often reaching magnitudes in excess of 20 p.s.i., is a major cause of ply and top ply separations.

It has been the general practice heretofore to effect external venting of tires by one of two manual procedures. One of these is the manual manipulation of a power driven drill by which a plurality of holes are drilled into the tire adjacent the bead to a depth sufficient to penetrate the cords. It has been found, however, that even if this procedure is accomplished with sufficient skill to reach the proper depth of drilling, the rate of release of air pressure is insufficient to prevent ply separation. More often, on the other hand, this procedure results either in the drilling of holes of insufficient depth to penetrate the cords, or of such greater depth as to penetrate the inner liner and cause breakout.

The second manual procedure employed heretofore has been the manual manipulation of an awl or ice pick, directed to enter the outside of the tire sufficiently above the heel of the bead so as to clear the lip of the wheel rim upon mounting of the tire, and then projected angularly inward to the central portion of the bead area where the plys wrap around the bead.

It has been found that as air enters the cord body is travels to the bead area and then redistributes throughout the casing, and thus the venting of the bead area is most effective in relieving air pressure within the cord body. Moreover, it has been found that the use of an awl or ice pick, as compared with a drill, provides much faster release of air pressure. However, this manual procedure presents the same problem as drill venting with respect to the inability to obtain consistent depth of penetration and proper termination in the bead area. A second difficulty with this procedure arises from the fact that the tire casing tends to collapse during penetration of the awl, thus magnifying the difficulty of obtaining proper direction and depth of penetration.

The foregoing problems relate to pneumatic tires having a single reinforcing bead and utilized primarily on passenger cars and lighter vehicles. However, larger tires, such as those provided for trucks, aircraft, earthmoving equipment, etc. are provided with two or more reinforcing beads spaced apart transversely in the wheel rim portion of the tire. In attempting to prevent ply separation in these larger tires, it has been the general practice hereing of the areas adjacent all of the beads of a multiple bead Applicants have found, however, that whereas such venting is ineffective to prevent ply separation, effective venting is achieved by venting the spaces adjacent all of the beads.

Accordingly, it is the principal object of the present invention to provide apparatus by which to effect the venting of the areas adjacent all the beads of a multiple bead tire, whereby to eliminate ply separation in all areas of the tire.

Another important object of this invention is the provision of a pneumatic tire incorporating means by which to insure continuous venting of the area adjacent every bead incorporated in the tire.

A further important object of the present invention is the provision of apparatus by which to achieve the effective venting of the areas adjacent the beads of multibead tires of various sizes and shapes.

The foregoing and other objects and advantages of this invention will appear from the following detailed description, taken in connection with the accompanying drawings in which.

Figure 2:
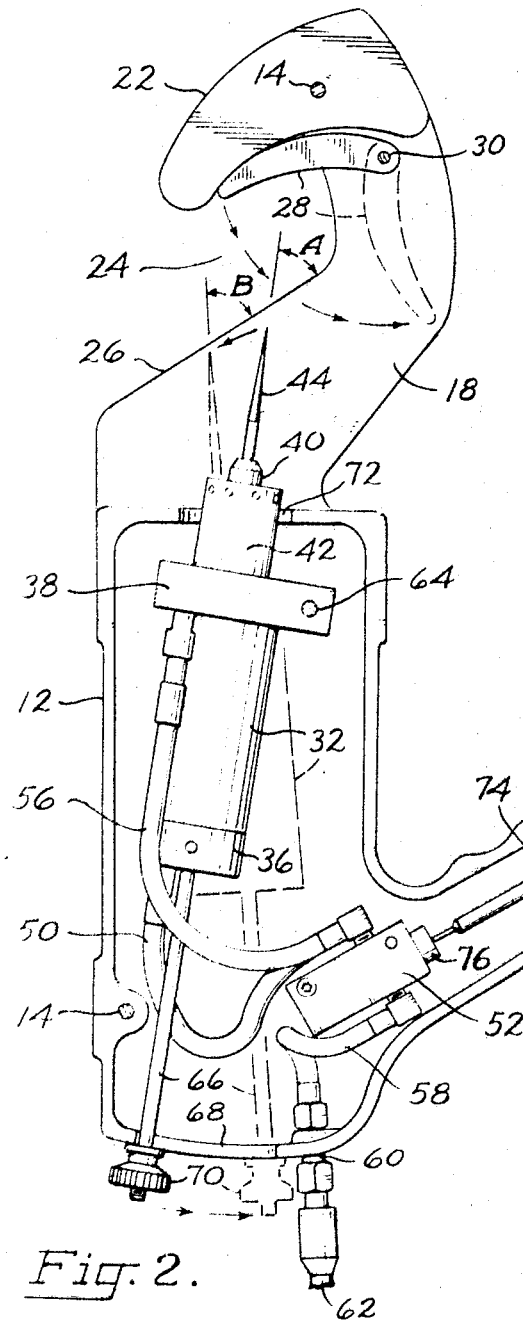
FIG. 2 is a side view of the apparatus shown in FIG. 1, as viewed from the left in FIG. 1, with the left hand half of the housing removed, alternate positions of adjustable components of the apparatus being illustrated in solid lines and dash lines, respectively.
Figure 1:
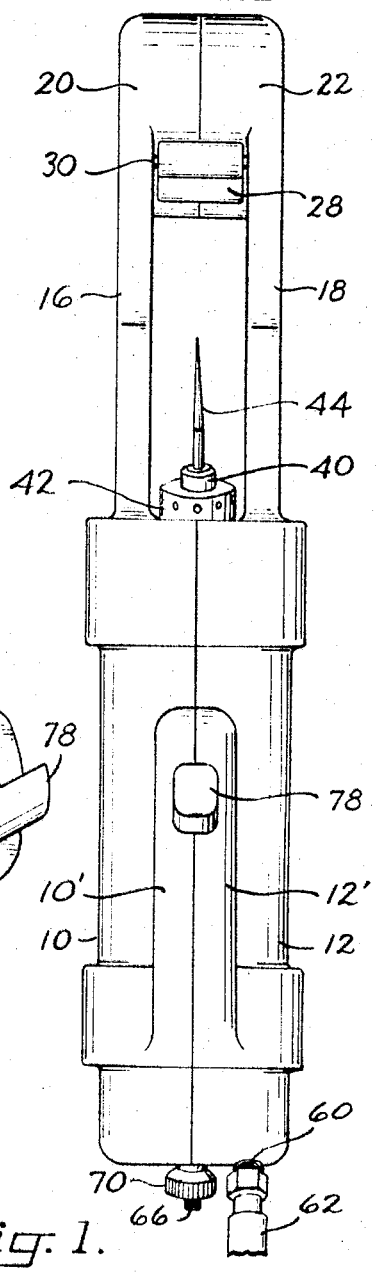
FIG. 1 is a plan view of tire venting apparatus embodying the features of the present invention.
Figure 3:
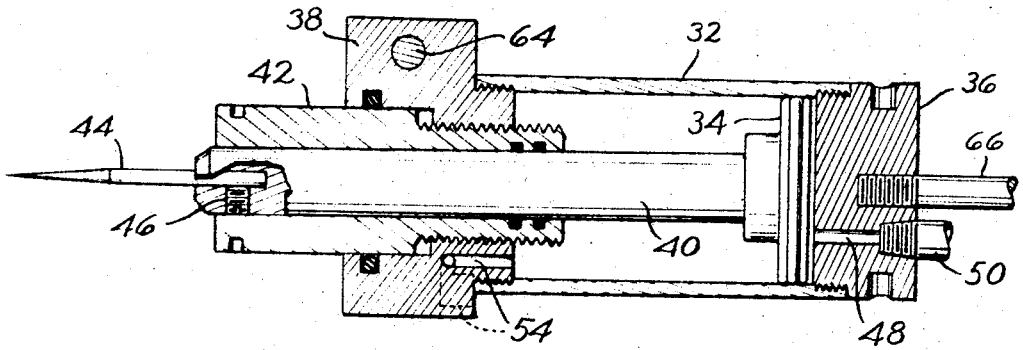
FIG. 3 is a fragmentary sectional view showing details of construction of the reciprocating drive unit for the piercing element of the apparatus.

Referring first to the apparatus illustrated in FIGS. 1–3, the body is provided in two longitudinal halves 10, 12 secured together removably by such means as the screws 14. Registering offset portions 10', 12' of the body halves form a hand grip by which to manipulate the apparatus.

The forward head portion of the body includes a pair of laterally spaced elongated fingers 16, 18 the outer ends of which are offset angularly and there joined to the jaw sections 20, 22 which register with each other to form a jaw member. This jaw member projects rearward from the fingers to define a recess 24 therebetween for freely receiving the bead portion of a tire. The surfaces 26 of the fingers facing the jaw member serve to abut against the outer surface of a tire.

In order to accommodate tires of various sizes and shapes within the recess 24, means is provided for varying the operative width of the recess. In the embodiment illustrated, such means is provided by the blade 28 which is mounted on the pivot pin 30 extending between the spaced fingers and is dimensioned to swing freely through said space between the retracted position illustrated in dash lines in FIG. 2 and the extended position illustrated in solid lines.

Registering hollow portions within the body halves rearwardly of the head portion removably receive an elongated pneumatic piston-cylinder unit illustrated in detail in FIG. 3. The hollow cylinder 32 confines a piston 34 slidably therein, between the rearward end plug 36 and the forward end plug 38. The piston rod 40 connected to the piston extends forwardly through the longitudinal bore of the adjustment sleeve 42. The rearward portion of the sleeve is provided with an external thread for engagement with the matching internal thread on the inner portion of the longitudinal bore in the forward end plug 38, whereby rotation of the sleeve relative to the plug effects longitudinal adjustment of the sleeve. O-ring seals between the piston rod and sleeve and between the sleeve and plug, respectively, prevent the escape of pneumatic pressure from within the cylinder.

The projecting forward end of the piston rod 40 is provided with a central bore in which to seat the rearward end of an elongated, forwardly pointed tire piercing needle 44. The needle is secured removably to the rod by such means as the set screw 46.

The rearward end of the cylinder 32 communicates through the port 48 in the rear plug 36, with one end of a conduit 50 the opposite end of which is connected to one port of a conventional control valve 52 (FIG. 2). The forward end of the cylinder communicates through the port 54 in the forward plug 38 with one end of a conduit 56 the opposite end of which is connected to a second port in the control valve. A third port in the control valve is connected to one end of a conduit 58 the opposite end of which is connected to a coupling 60 which extends through the rear wall of the body for connection of a line 62 leading from a source of pneumatic pressure.

The forward plug 38 is provided with a laterally displaced transverse opening through which is freely received the pivot pin 64 secured at its opposite ends to the spaced halves of the body. The piston-cylinder unit thus is mounted within the hollow body for pivotal movement about the pin, to accommodate adjustment of the angle of penetration of the needle, as explained more fully hereinafter. Pivotal adjustment of the piston-cylinder unit is facilitated by the provision of the elongated rod 66 which projects rearwardly from the rear plug 36 and through an elongated slot 68 in the rear wall of the body. The portion of the rod projecting through the slot is threaded for reception of the clamping nut 70 which serves the dual function of a finger grip by which to adjust the rod along the slot, and a clamping nut which may be tightened against the body to secure the power unit in any desired position of pivoted adjustment.

The forward portion of the sleeve 42 projects freely through an opening 72 in the front wall of the body halves, and this opening is elongated sufficiently to accommodate the aforementioned pivotal adjustment of the power unit, as illustrated.

Adjustment of the control valve 52 is provided by the elongated trigger rod 74 the inner end of which is connected to the longitudinally movable sleeve member 76 of the valve and the outer end of which is connected to a trigger button 78 which extends freely outward through an opening in the outer end of the hand grip portions 10', 12'. An internal spring in the control valve urges the valve sleeve and trigger button resiliently outward to the position illustrated in FIG. 2. In this position of adjustment of the valve, pneumatic pressure is supplied from the line 62 through the conduit 58 and valve 52, thence through the conduit 56 and the port 54 to the forward end of the cylinder 32. The piston 34 thus is moved to the rearward end of the cylinder and the needle 44 is in retracted position, as illustrated in FIGS. 1–3. Pneumatic pressure on the opposite side of the piston is exhausted to the atmosphere through the port 48 in the rear plug, thence through the conduit 50 to an exaust port in the control valve, as will be understood.

When the trigger button 78 is pressed inward, the valve sleeve 76 is moved inward to the position at which pneumatic pressure from the line 62 is conducted through the conduit 58 and valve 52, thence through the conduit 50 and the port 48 in the rear plug to the rearward end of the cylinder, thus driving the piston 34 forwardly to extend the needle. Pneumatic pressure on the forward side of the piston is exhausted to the atmosphere through the port 54 in the forward plug, thence through te conduit 56 and the exhaust port in the control valve.

The operation of the apparatus described hereinbefore, is as follows: First, let it be assumed that it is desired to vent a tire 80 of the type and size illustrated in FIG. 4. This tire is provided with two transversely spaced reinforcing beads 82 and 84 in the wheel flange portion 80' of the tire, each bead being disposed between adjacent layers of cord material 86 confined between the plys of rubber which constitute a conventional tire. The adjacent cord layers associated with each bead define an air collecting space 88 adjacent the bead, and it is both of these spaces that must be vented.

Figure 4:
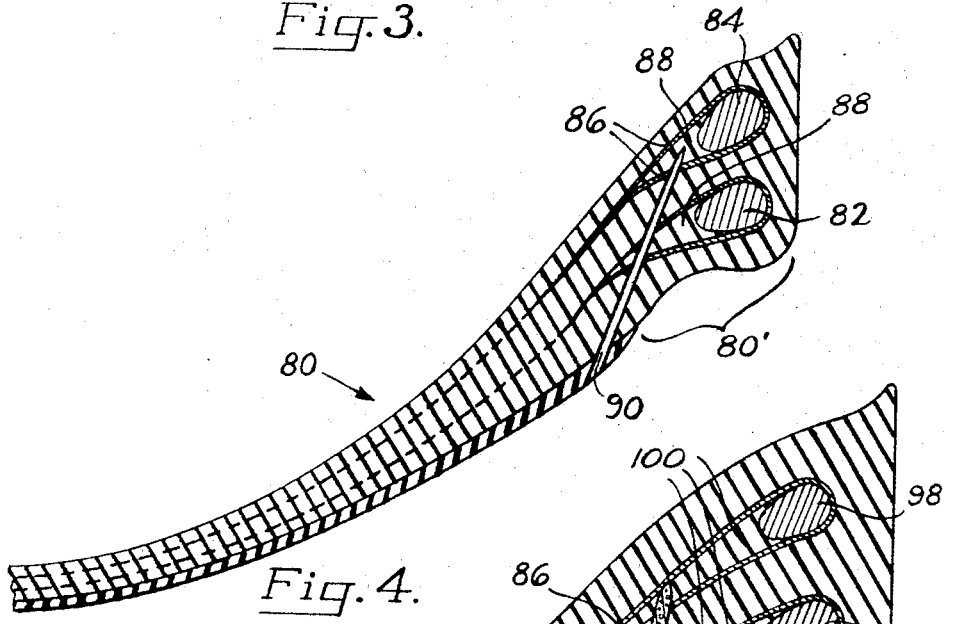
FIG. 4 is a fragmetnary sectional view of a two bead tire showing one manner of venting in accordance with the present invention.

To accommodate the tire illustrated in FIG. 4, the blade 28 is pivoted to the operative position shown in solid lines in FIG. 2, to constrict the width of the recess 24. The power unit also is adjusted to the position illustrated in solid lines in FIG. 2. In this position of adjustment the included angle A formed between the longitudinal axis of movement of the needle 44 and the tire bearing surfaces 26 of the fingers provides the proper angle of penetration of the needle into the tire from a point on the outer surface thereof, outwardly of the wheel flange portion 80', to intercept both air collecting spaces 88 adjacent the beads 82 and 84. The depth of penetration of the needle sufficient to intercept the space associated with the inner bead 84, is achieved by adjusting the sleeve 42 longitudinally with respect to the cylinder 32 such that when the forward end of the piston 34 abuts the rearward end of the sleeve, the tip of the needle 44 has entered the space 88 adjacent the bead 84.

The hand grip portion of the body then is taken into the hand and the apparatus manipulated to draw the bead portion 80' of the tire into the recess 24 defined between the blade 28 and the surfaces 26 of the head portion. The thumb of the hand then is placed on the trigger button 78 and the latter pressed inward to effect extension of the needle.

Upon release of the button 78, the needle is retracted from the tire producing the vent opening 90 which traverses both spaces 88 associated with the beads 82 and 84.

Figure 5:
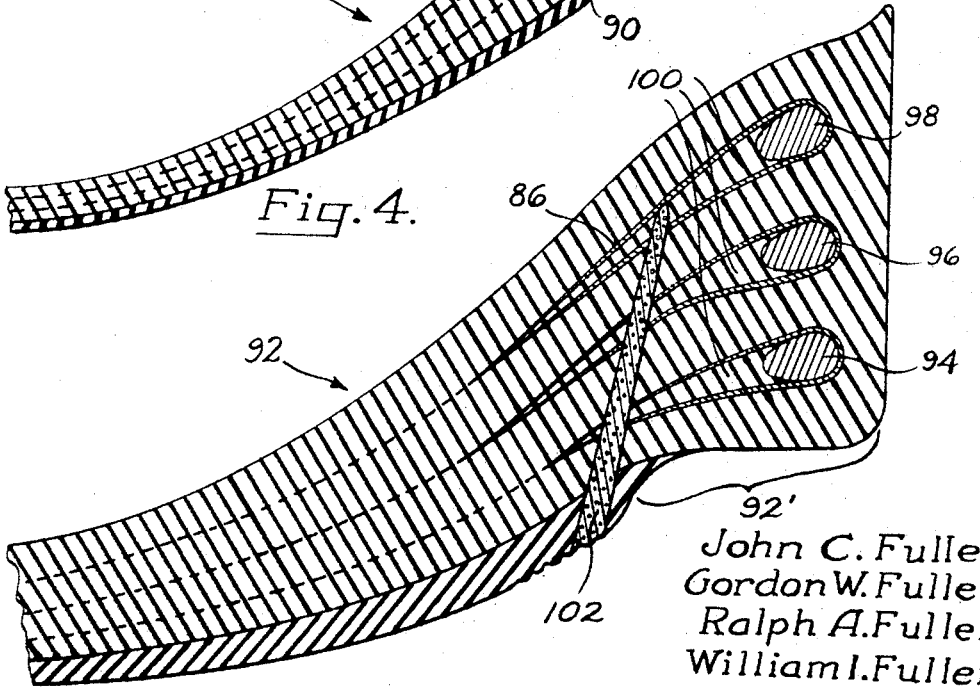
FIG. 5 is a fragmentary sectional view of a three bead tire illustrating a second manner of venting in accordance with the present invention.

In the event the tire to be vented is of the type illustrated in FIG. 5, wherein the wheel flange portion 92' of the tire 92 is provided with three transversely spaced beads 94, 96 and 98, the pivoted arms 28 is swung out of the recess 24, into the space between the fingers 16 and 18, to enlarge the recess sufficiently to receive the beads portion 92' of the tire. The power unit is rotated counterclockwise, about pivot pin 64, to the position illustrated in dash lines in FIG. 2, so that the angle B provides the proper angle of penetration of the needle 44 into the tire to intercept the spaces 100 associated with all of the beads. The abutment sleeve 42 is adjusted outward to increase the stroke of the piston 34 sufficiently for the needle to penetrate the tire to intercept all of said spaces.

An alternative procedure for venting a tire also is illustrated in FIG. 5. Instead of piercing the tire with a needle, as previously described, a porous member 102 is installed in the tire during its fabrication and prior to curing of the rubber. The porous member extends into the tire substantially in the same manner as vent opening 90 in FIG. 4., namely angularly from a point on the outer surface thereof outwardly of the wheel flange portion 92', in a direction and to a sufficient depth to intercept the spaces 100 associated with all of the beads. When thus installed, the rubber is treated for curing, whereupon the porous member is bonded permanently into the tire.

The porous member may be a hollow tube provided with a multiplicity of openings in its wall. Alternatively, it may be a length of rope composed of a multiplicity of braided or twisted strands of filaments between which are provided air passageways for the escape of air pressure outwardly therethrough. The porous member may take other forms, as desired, and it may be made from flexible synthetic plastic or other suitable material.

In the alternative, the porous member 102 may be installed in a completely fabricated tire by first providing a vent opening in the tire, and then inserting the porous member into the vent opening.

It will be understood that any of the foregoing venting procedures of the present invention preferably is repeated to provide a plurality of vents spaced circumferentially about the tire adjacent both wheel flange portions, to insure adequate and uniform relief of internal pressure.

It will be apparent to those skilled in the art that various changes may be made in the method steps, types and sizes of materials and other structural details described hereinbefore, without departing from the spirit of this invention and the scope of the appended claims.

Having now described our invention and the manner in which it may be used, what we claim as new and desire to secure by Letters Patent is:

1. Apparatus for venting pneumatic tires, comprising:
   (a) a body having a head portion defining a recess adapted to receive therein the bead portion of a tire,
   (b) the recess being defined in part by a bearing surface of the head portion adapted to abut against the outer surface of a tire,
   (c) an elongated tire piercing member mounted on the body for movement across the plane of said bearing surface between a retracted position adjacent said recess and a tire piercing position into said recess for penetrating a tire inwardly from the outer side thereof to an internal position adjacent the bead of the tire,
   (d) drive means on the body engaging the piercing member for moving the latter, and
   (e) mounting means interengaging the body and drive means for adjusting the axis of movement of the piercing member angularly with respect to said bearing surface.

2. The apparatus of claim 1 including blade means mounted on the head portion for movement into and out of said recess for adjusting the width of the latter to accommodate pneumatic tires having bead portions of varying thickness.

References Cited

UNITED STATES PATENTS

| | | | |
|---|---|---|---|
| 1,392,576 | 10/1921 | Goodenberger | 156—87 |
| 2,031,560 | 2/1936 | Day | 152—330 |
| 2,561,012 | 7/1951 | Clark | 156—87 X |
| 2,973,799 | 3/1961 | Kelly | 156—87 |
| 3,109,338 | 11/1963 | Wise | 83—2 |
| 3,124,978 | 3/1964 | Barns et al. | 83—2 |
| 3,154,985 | 11/1964 | Hermanns | 83—2 |
| 3,192,087 | 6/1965 | Close et al. | 156—135 X |

EARL M. BERGERT, *Primary Examiner.*

C. B. COSBY, *Assistant Examiner.*

U.S. Cl. X.R.

30—366; 83—2; 152—330; 156—87, 398, 510, 579